US012717548B2

(12) United States Patent
Menon et al.

(10) Patent No.: US 12,717,548 B2
(45) Date of Patent: Aug. 25, 2026

(54) EMBEDDED ARITHMETIC BLOCKS FOR STRUCTURED ASICs

(71) Applicant: Altera Corporation, San Jose, CA (US)

(72) Inventors: Sankaran Menon, Austin, TX (US); Martin Langhammer, Alderbury (GB); Mustansir Fanaswalla, Pleasanton, CA (US); Kuldeep Simha, Lake Oswego, OR (US)

(73) Assignee: Altera Corporation, San Jose, CA (US)

( * ) Notice: Subject to any disclaimer, the term of this patent is extended or adjusted under 35 U.S.C. 154(b) by 397 days.

(21) Appl. No.: 17/559,851

(22) Filed: Dec. 22, 2021

(65) Prior Publication Data

US 2023/0195416 A1 Jun. 22, 2023

(51) Int. Cl.
*G06F 7/57* (2006.01)

(52) U.S. Cl.
CPC .................................... *G06F 7/57* (2013.01)

(58) Field of Classification Search
CPC ........................................................ G06F 7/57
See application file for complete search history.

(56) References Cited

U.S. PATENT DOCUMENTS

| | | | | |
|---|---|---|---|---|
| 4,754,412 A * | 6/1988 | Deering | G06F 7/544 708/201 |
| 2014/0103959 A1* | 4/2014 | Andreev | G06F 30/327 716/105 |
| 2015/0270214 A1* | 9/2015 | Chuang | G06F 30/392 716/120 |
| 2016/0124899 A1* | 5/2016 | Vasishta | G06F 15/7889 712/35 |
| 2018/0321938 A1* | 11/2018 | Boswell | G06F 9/3001 |
| 2021/0319079 A1* | 10/2021 | Abdelaziz | G06F 7/5443 |

OTHER PUBLICATIONS

Ran et al., "The magic of a via-configurable regular fabric," IEEE International Conference on Computer Design: VLSI in Computers and Processors, 2004. ICCD 2004. Proceedings., San Jose, CA, USA, 2004, pp. 338-343, doi: 10.1109/ICCD.2004.1347943. (Year: 2004).*

Hutton et al., "A Methodology for FPGA to Structured-ASIC Synthesis and Verification," Proceedings of the Design Automation & Test in Europe Conference, Munich, Germany, 2006, pp. 1-6, doi: 10.1109/DATE.2006.243775. (Year: 2006).*

* cited by examiner

*Primary Examiner* — Carlo Waje
(74) *Attorney, Agent, or Firm* — Fletcher Yoder, P.C.

(57) ABSTRACT

An integrated circuit is provided that includes via-configured structured logic circuitry and an embedded arithmetic block that interfaces with the via-configured structured logic circuitry to perform an arithmetic function. The embedded arithmetic block includes at least one monolithic arithmetic circuit that can perform the arithmetic function more efficiently or taking up less die space than a comparable circuit formed from the via-configured structured logic circuitry.

20 Claims, 12 Drawing Sheets

90
152a
154a
88
144
DATA
STRUCTURED LOGIC CIRCUITRY
CONTROL
142
146
OUTPUT
88
STRUCTURED LOGIC CIRCUITRY
152b
154b
158
158
158

90
152a
154a
88
150a
144
DATA
STRUCTURED LOGIC CIRCUITRY
142
CONTROL
150b
146
OUTPUT
88
STRUCTURED LOGIC CIRCUITRY
152b
154b
158
158
158

152
160
Σ
X
+
88
144
DATA
STRUCTURED LOGIC CIRCUITRY
142
CONTROL
146
OUTPUT
166
158

90
168
170

EMBEDDED ARITHMETIC BLOCKS FOR STRUCTURED ASICs

BACKGROUND

The present disclosure relates to an integrated circuit that includes embedded arithmetic blocks that support via-configured structured logic circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices are used in numerous electronic systems. Computers, handheld devices, portable phones, televisions, industrial control systems, robotics, and telecommunication networking—to name just a few—all use integrated circuit devices. One type of integrated circuit device that can be customized at manufacturing is a structured application-specific integrated circuit (ASIC). A structured ASIC is similar to a field programmable gate array (FPGA) in that a structured ASIC is highly customizable and contains similar circuit elements. A structured ASIC is different from an FPGA, though, in that it may only be configured once at manufacture by selectively filling vias of a via layer with metal and that user logic circuit elements of the structured ASIC may take up substantially less space than those of an FPGA. Although the lack of a programmable fabric greatly reduces the die area involved for user logic in a structured ASIC, embedded features such as memory blocks and system-on-chip (SoC) subsystems occupy substantially the same total area in ASIC technology as in an FPGA. Thus, because these types of blocks are in ASIC, they are a small percentage of the standard FPGA die. But in a structured ASIC, where the user logic has been shrunk, they occupy a proportionally larger area of the die. Adding embedded blocks to a structured ASIC therefore results in those embedded blocks taking up a much greater proportion of the die area of the structured ASIC as compared to an FPGA, making embedded blocks in the structured ASIC comparatively more costly in terms of die space than embedded blocks in an FPGA.

Embedded blocks, such as digital signal processing (DSP) blocks, are increasingly used in FPGAs for numerous different use cases. These include low-precision applications such artificial intelligence (AI) and machine learning (ML), traditional DSP applications such as finite impulse response (FIR) filters, and very high precision (and floating point) applications such as high-performance computing (HPC). Even though the DSP blocks are useful for many FPGA applications, adding FPGA-style DSP blocks to a structured ASIC may unacceptably increase the relative cost for structured ASIC applications that do not make significant use of them.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
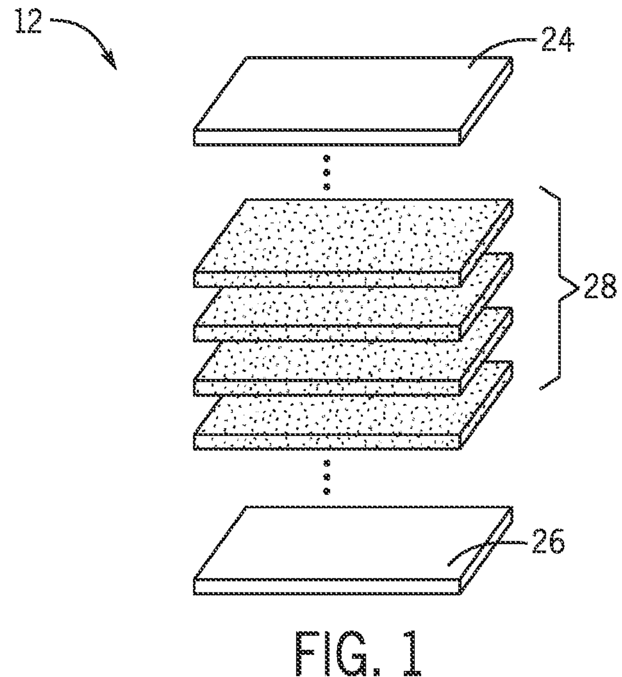
FIG. 1 is a schematic diagram illustrating multiple via-configurable layers of a structured ASIC that may also include embedded arithmetic blocks, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A structured application-specific integrated circuit (ASIC) is similar to a field programmable gate array (FPGA) in that a structured ASIC is highly customizable and contains similar circuit elements. A structured ASIC is different from an FPGA, though, in that it may only be configured once at manufacture and user logic circuit elements of the structured ASIC may take up substantially less space than those of an FPGA. Although the lack of a programmable fabric greatly reduces the die area involved for user logic in a structured ASIC, embedded features such as memory blocks and system-on-chip (SoC) subsystems occupy substantially the same total area in ASIC technology as in an FPGA. Thus, because these types of blocks are in ASIC, they are a small percentage of the standard FPGA die. But in a structured ASIC, where the user logic has been shrunk, they suddenly become a much larger area of the die.

Embedded blocks, such as digital signal processing (DSP) blocks, are increasingly used in FPGAs for numerous different use cases. These include low-precision applications such artificial intelligence (AI) and machine learning (ML), traditional DSP applications such as finite impulse response (FIR) filters, and very high precision (and floating point) applications such as high-performance computing (HPC). Even though the DSP blocks are useful for many FPGA applications, adding FPGA-style DSP blocks to a structured array may unacceptably increase the relative cost for structured ASIC applications that do not make significant use of them.

Rather than copying the DSP block from a regular FPGA, this disclosure describes an embedded arithmetic block that may take the form of an embedded arithmetic array. The embedded arithmetic block may be able to emulate the functions of any known embedded DSP block using a combination of a block of ASIC components and the structured logic. This is facilitated by certain distinctions between a structured ASIC and an FPGA—namely, that the potential routing density around the embedded arithmetic block shoreline may be much greater in a structured ASIC than may be possible using the programmable routing used for an FPGA DSP block.

Such an embedded arithmetic block, which may also be referred to as an embedded ASIC block, may be much smaller than an FPGA DSP block. In fact, this disclosure illustrates multiple versions of embedded ASIC blocks. Different blocks can be swapped in and out, so that different members of a structured ASIC family may contain different arithmetic blocks. Often, the design and verification of an FPGA DSP block takes a substantial amount of time and effort. Consequently, a particular family of devices may generally use only one type of DSP block. Instead, this disclosure describes arithmetic blocks of components that are correct by design, meaning that the arithmetic blocks are composed of pre-verified monolithic arithmetic components. For example, these may come from commercially available IP. The design possibilities are then transferred to the act of combining these elements together using the embedded structured logic. Since only a subset of the arithmetic circuitry that may be found in the very complex FPGA DSP block is used in the embedded arithmetic blocks, the effort may be substantially contained. Indeed, this work can be done by the structured ASIC vendor. For example, a library of modes of the embedded arithmetic block may be built and verified. This way, the most popular modes of the embedded arithmetic block could be built first, or a particular mode requested by a customer. Therefore, only the effort actually involved in meeting a customer specification could be carried out at the time of customer design—rather than speculative effort years in advance of the device being ready. Customers may also assemble their own modes, or even modes not envisioned by the vendor.

Before continuing, FIGS. 1-8 provide an overview of via-configurable structured application-specific integrated circuits (ASICs). Generally speaking, a structured ASIC is an integrated circuit that contains circuitry that can be configured to implement numerous possible system designs based on the way it is manufactured. In particular, a via layer (or multiple via layers) may be used to connect components and circuitry between the layers of the integrated circuit device. Thus, via openings may be selectively located and formed (e.g., filled or coated with metal) on the via layer to create interconnections between the various components to implement a particular functionality in the integrated circuit device.

Depending on which vias are selectively filled with metal, the underlying circuitry of the integrated circuit may change its operation. The resulting circuitry may be referred to as "via-configured" since the particular system arrangement could have been different but for the particular via selection. This will be explained below using a series of simplified examples. A structured ASIC, in particular, may include numerous via-configurable routing circuits and lookup tables (LUTs) that may emulate numerous potential system designs depending on the vias that are filled. Moreover, as will be discussed further below, the embedded arithmetic blocks may or may not be via-configurable themselves. Some embedded arithmetic blocks may include control circuitry (e.g., a state machine) to control the arithmetic components of the embedded arithmetic block. The control circuitry may interface with the structured logic circuitry to allow a user design that has been via-configured in the structured logic circuitry may control the operation of the embedded arithmetic block.

While this disclosure will primarily use the example of a structured application-specific integrated circuit (ASIC), the systems and methods of this disclosure may apply to any suitable integrated circuit devices that are via-configurable at manufacture or in the field. For example, the methods and devices may be incorporated into numerous types of devices such as a microprocessor, system on chip (SoC), or other integrated circuits. Example integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application-specific standard products (ASSPs), and microprocessors, just to name a few.

With the foregoing in mind, FIG. 1 illustrates an integrated circuit device 12 that may have structured logic circuit layers that have circuitry common to other integrated circuits and several via layers that effectively configure the structure logic circuitry. FIG. 1 illustrates a three-dimensional schematic diagram of the integrated circuit device 12 having multiple layers of circuitry. As shown, the integrated circuit device 12 may include a first set of circuit layers 24 and a second set of circuit layers 26. Indeed, although the example shown in FIG. 1 appears to illustrate a single first circuit layer 24 and a single second circuit layer 26, it should be noted that the methods and systems described herein may also be performed and implemented for integrated circuit devices 12 having more than two layers (e.g., 4 layers, 18 layers, 24 layers, 80 layers, and so forth). By way of example, circuit components for the structured ASIC circuit may be formed in the first set of circuit layers 24 and/or the second set of circuit layers 26. The electrical connections of these layers, and therefore the functionality of the integrated circuit 12, may vary based on the way certain via layers 28 connect to circuits patterned in the first set of circuit layers 24 and second set of circuit layers 26. While the via layers 28 are shown between the first set of layers 24 and the second set of layers 26, there may be multiple sets of other layers similar to the first set of layers 24 and second set of layers 26 that can be configured by multiple sets of via layers other than the via layers 28.

The circuit layers 24 and 26 may be designed to have a variety of possible connections at a variety of possible via sites. Vias are integrated circuit structures that allow circuitry on one layer to form a connection with circuitry on another layer. Depending on the via configuration of the via layers 28, the circuit layers 24 and 26 may have different functionalities. Thus, many different specifications may be manufactured using the same circuit layers 24 and 26, but the integrated circuit devices 12 may be manufactured to have different specifications by selecting a different via configuration for the one or more via layers 28. Although the depicted embodiment illustrates a first circuit layer 24 and a second circuit layer 26, which represents a particular embodiment, it should be noted that the methods and systems described herein may also be performed and implemented for integrated circuit devices 12 having more than two layers (e.g., 4 layers, 18 layers, 24 layers, and so forth). Moreover, one or more via layers 28 may also be disposed to connect to an outer surface for selectively connecting to circuitry in a 2.5D or 3D configuration (e.g., another integrated circuit device 12, an interposer, an Embedded Multi-Die Interconnect Bridge (EMIB) by Intel Corporation®).

The one or more via layers 28 may be manufactured to have a variety of different possible via configurations, where each via configuration provides different connections that determine the functionality of the first circuit layer 24 and the second circuit layer 26. Thus, by manufacturing the one or more via layers 28 using a particular selected photomask or photomask set, a functionality of the circuit layers 24 and 26 may be controlled.

Figure 2:
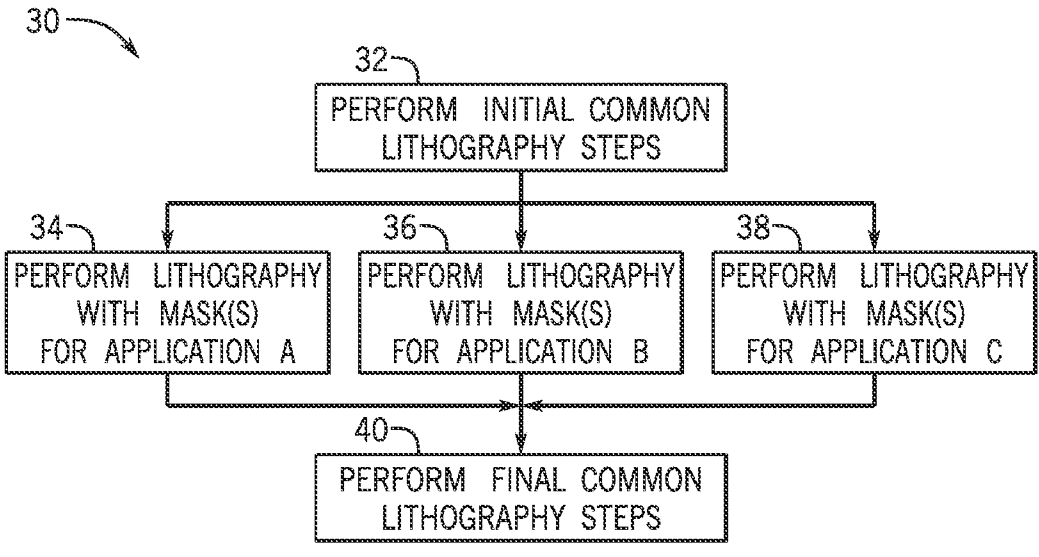
FIG. 2 is a process flow diagram of a lithography process to fabricate the integrated circuit device with a via layer to configure a structured ASIC, in accordance with an embodiment.

To illustrate, FIG. 2 shows a process flow diagram of process 30 for fabricating an integrated circuit device 12 with a particular via layer that causes the integrated circuit device 12 to selectively provide functionality for many different applications depending on the via configuration of the via layer. In general, the overall process 30 for fabricating integrated circuit devices 12 for each particular application includes steps of depositing, patterning, removing, and modifying electrical properties. As shown, the process may begin with performing (block 32) initial common lithography steps. These steps may include the depositing process, which includes coating or transferring photoresist material (e.g., liquid polymeric material or dry film photoresists) onto a substrate, such as a wafer. The photoresist is material that the image may be transferred to during the patterning process. Some of the initial common lithography steps of block 32 may include patterning some or all of the via-configurable structured logic circuitry.

Patterning may include fabricating a pattern from a photomask onto the wafer by exposing the wafer to light using the photomask. As previously discussed, photomasks are often formed from silica plates with a pattern, such as a circuit pattern, of opaque and transparent areas that are projected onto the wafer to define the layout of the integrated circuit. In some implementations, a set of photomasks may be used to define one or more pattern layers of the multi-layered structure of the integrated circuit device 12. In general, the photomask is placed over the substrate and a short-wavelength light is passed through to project the pattern onto the substrate surface.

While the common lithography steps of block 32 are common to all versions of the integrated circuit device 12 that are manufactured using the process 30, different versions of the integrated circuit device 12 may have different functionalities associated with different applications (e.g., shown here as Application A, Application B, and Application C) depending on the particular via configuration of one or more via layers of the integrated circuit device 12. In the context of a structured ASIC, there may be an effectively unlimited number of possible applications that may be implemented by customizing the via configuration of the via layers of the integrated circuit device 12. Thus, the process 30 may also include performing (block 34) lithography with mask(s) for Application A that produces one or more via layers that will form connections that cause the circuitry formed at block 32 to operate with a first functionality. On the other hand, the process 30 may include performing (block 36) lithography with mask(s) for Application B that produces one or more via layers that will form connections that cause the circuitry formed at block 32 to operate with a second functionality. Further, the process 30 may include performing (block 38) lithography with mask(s) for Application C that produces one or more via layers that will form connections that cause the circuitry formed at block 32 to operate with a third functionality associated with Application C. Specifically, performing lithography for each of these applications may include selecting via sites of the via layer to configure for either the integrated circuit device for Application A, Application B, or Application C.

Thus, the one or more via layer photomasks or photomask sets are used to pattern and selectively connect circuitry for each of the different integrated circuit devices 12 (e.g., integrated circuits for each Application A, B, and C) that may be manufactured by the process 30. Indeed, in the context of a structured ASIC, there may be a customized photomask set that can configure structured logic defined by circuitry in the common lithography steps to implement any of a vast variety of possible system designs. The process 30 may also include performing (block 40) certain final common lithography steps, which may include steps related to the removal of coating and modification of electrical properties. It should be appreciated that the process 30 may include any other suitable fabrication stages or steps that may include other common sets of photomasks that pattern via-configurable circuitry or other customized sets of photomasks that can use vias to configure the via-configurable circuitry.

The selectable via sites may be filled (e.g., configured or selected) or remain unfilled (e.g., not selected) depending on the specific application to be performed. In the simplified example shown here, when the via layer is configured for Application A by selecting particular via sites that connect the corresponding circuitry to perform Application A, there may be via sites that remain unselected since the circuitry connected to those via sites may not be used to perform the functions of Application A. Similarly, some of the via sites used to perform application A may not be selected when the via layer is configured for Application B. As such, using a lithography process for each particular application (e.g., Applications A, B, and C) may be mitigated or avoided by using the configurable via layer. Thus, fewer photomasks and/or application-specific integrated circuit devices 12 may be manufactured, resulting in lower manufacturing costs and more efficient integrated circuit devices 12. Upon configuring the via layer for the particular application, such as by selecting particular vias (e.g., filing via openings with metal) to interconnect circuitry used for the particular application, the integrated circuit device 12 may have a static via configuration and the circuits may be understood to be "via-configured."

To facilitate the reuse of circuitry between the layers of the single integrated circuit device 12 to implement different applications, vias may be used. For example, and referring back to Applications A and B, some of the circuitry that are used for Application A may also be used for the circuitry for Application B. Thus, the circuitry may be reused when the via layer is configured for either Application A or Application B. To illustrate, FIG. 3A, which represents a simplified example, depicts an integrated circuit device 12 with a via layer 50 (e.g., one or more via layers 28 of FIG. 1) including selectable via sites 56 that may connect circuitry residing on different layers of the integrated circuit device 12. Although the integrated circuit device 12 is discussed as having two layers (e.g., first circuit layer 24 and second circuit layer 26 of FIG. 1) in the current embodiment, it should be appreciated that three or more layers may be used to implement different applications or functions using the vias connections described herein. The additional via layers 50 may be used to connect circuitry between the three or more layers.

As shown, the via layer 50 may include a vertical segment layer 52 (as indicated by the vertical bold lines) of metal segments and a horizontal segment layer 54 (as indicated by the horizontal and relatively thinner lines) of metal segments. The vertical segment layer 52 and the horizontal segment layer 54 may each include selectable via sites 56, which may be used to interconnect segments of the vertical and horizontal segment layers 52 and 54. In some implementations, jumpers 58 may be selectively placed vertically or horizontally along the segments of the vertical segment layer 52 and the horizontal segment layer 54 to facilitate vias connections that may otherwise be disconnected. For example, the jumpers 58 may facilitate in connecting or disconnecting via sites 56 to connect or disconnect segments. As such, the via layer 50 may also be configured using the jumpers 58. The circuitry on the first circuit layer 24 and the second circuit layer 26 that are connected to a respective segment of the via layer 50 (e.g., vertical segment layer 52 and the horizontal segment layer 54) may be connected or disconnected using the via sites 56 to form a circuit for a particular application.

To illustrate, selected vias (e.g., via sites filled with metal to create interconnection) are indicated by darkened selectable via sites 56 in the depicted embodiments. As shown, jumpers 58A, B, C, D, and E create a link between selectable via sites 56 that are on the same segment layer. For example, selectable via sites 56A and 56B may reside on separate segments of the vertical segment layer 52. Accordingly, jumper 58A may connect these two segments, such that when the selectable via sites 56A and 56B are selected, circuitry on their respective segments may be connected. Similarly, jumpers 58B, 58C, 58D, and 58E may connect selectable via sites 56, such that the jumpers 58 allow a connection to be made between segments of the vertical segment layer 52 or the horizontal segment layer 54, and between the vertical segment layer 52 and the horizontal segment layer 54 when their respective selectable via sites 56 are selected.

Figure 3A:
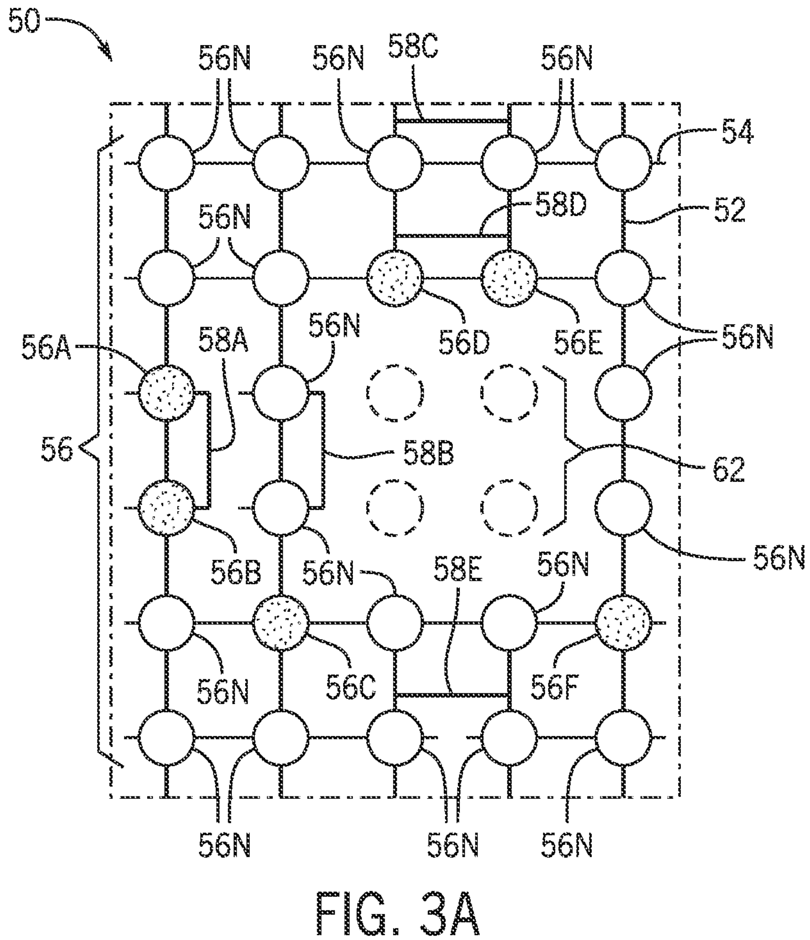
FIG. 3A is a block diagram of a via layer with via connections between multiple layers of the integrated circuit device, in accordance with an embodiment.

Although jumpers 58 may be placed between segments of the vertical segment layer 52 and the horizontal segment layer 54, some of the selectable via sites 56 may not be selected, shown in FIG. 3A as unfilled via sites 56N. In such instances, segments of vertical segment layer 52 and the horizontal segment layer 54 may not be connected. For example, jumper 58E may connect two segments of the horizontal segment layer 54 when the selectable via sites 56 are selected. Since these selectable via sites 56 are not selected, the segments may not be connected and, thus, the circuitry on those segments may not be interconnected. Moreover, in some implementations, non-selectable via sites 62 may be included on the vertical segment layer 52 and/or the horizontal segment layer 54. The non-selectable via sites 62 may include areas that may not be suitable for a selectable via site 56. These areas may not be adjacent or parallel to circuitry on the other layers, may include jumper connections, or that may include base circuitry or application-specific circuitry that is not compatible for use for a different application.

Figure 3B:
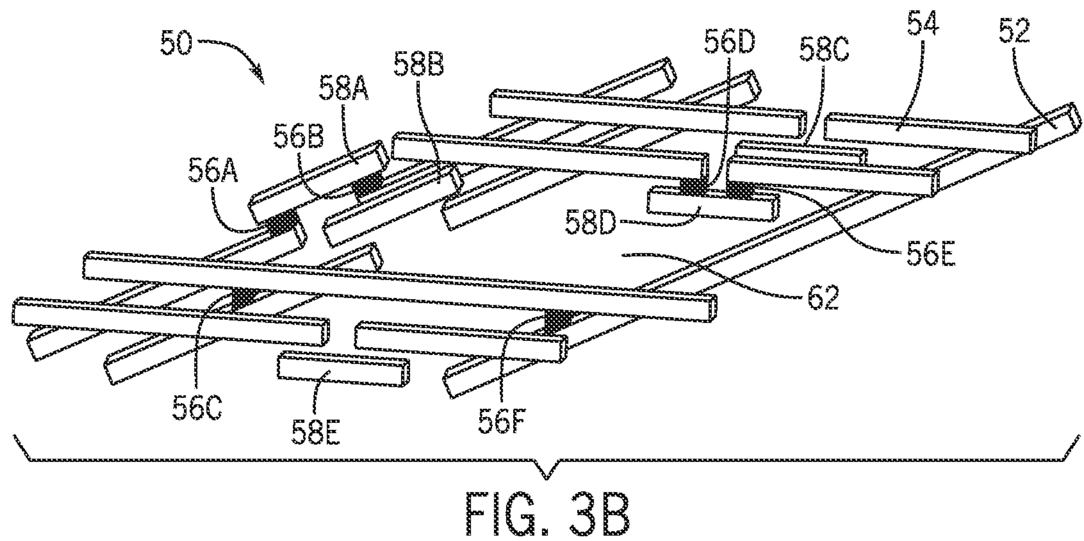
FIG. 3B is a block diagram of the via layer of FIG. 3A, in accordance with an embodiment.

To further illustrate the connections between the layers 52 and 54 using jumpers 58 and/or selectable via sites 56, FIG. 3B depicts a three-dimensional (3-D) diagram of the via layer 50 of FIG. 2. As shown, segments of the vertical segment layer 52 and the horizontal segment layer 54 may be connected using jumpers 58 and selectable via sites 56 connections that correspond to FIG. 2. For example, selected via sites 56A and 56B may reside on separate segments of the first layer 52. Accordingly, jumper 58A may connect these two segments, such that when the selectable via sites 56A and 56B are selected, circuitry on their respective layer segments may be connected. Also corresponding to FIG. 2, jumpers 58B, 58C, 58D, and 58E may connect selectable via sites 56, such that jumpers 58 allow a connection to be made between segments of the vertical segment layer 52 and the horizontal segment layer 54, and between the vertical segment layer 52 and the horizontal segment layer 54 when their respective selectable via sites 56 are selected. These segments of layers 52 and 54 may include circuitry that may be connected to perform specific functions. Specifically, the selectable via sites 56 that are selected may be active sites used to short the path between the vertical segment layer 52 and the horizontal segment layer 54. In this manner, the circuitry on the portion of the layer connected to the via site 56 may connect or may not connect depending on the selection of the selectable via site 56.

Figure 5:
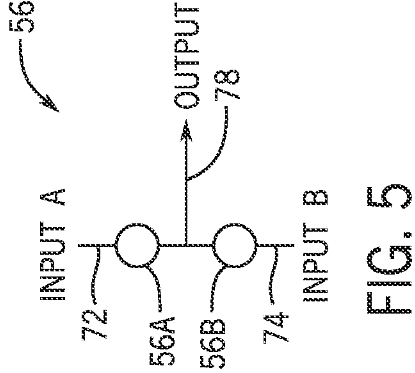
FIG. 5 is a schematic diagram of a via-configured switch, in which the selection has been configured by a via layer, that may act as an equivalent circuit to the multiplexer, in accordance with an embodiment.
Figure 4:
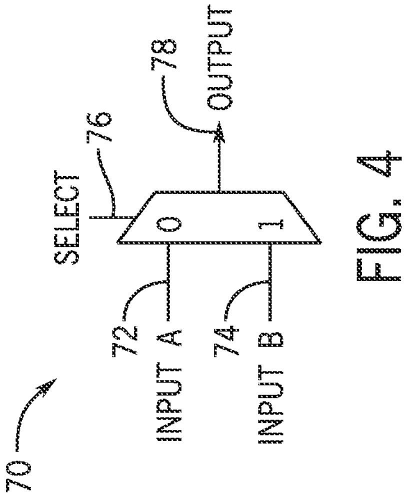
FIG. 4 is a schematic diagram of a multiplexer circuit of an FPGA, in accordance with an embodiment.

FIGS. 4 and 5 illustrate the similarities and differences between dynamically configurable circuitry (FIG. 4) and via-configurable circuitry (FIG. 5). In FIG. 4, a multiplexer 70 may be dynamically configured and programmed to select a circuit configuration. As shown, the multiplexer 70 may include two input ports, input A 72 and input B 74, one control select signal, select 76, and an output port, output 78. A control select signal at select 76 may be used to control which input port (e.g., input A 72 or input B 74) is utilized to select one of the circuit configurations of the circuitry. For example, input A 72 may be used for the output 78 when the control signal at select 76 has a value of "0". On the other hand, input B 74 may be used for the output 78 when the control signal at select 76 has a value of "1". The multiplexer circuitry takes up more die area to enable the selection, yet may be dynamically changed at runtime.

By contrast, FIG. 5 depicts a via-configurable selection circuit that operates as a via-configured switch when a particular via site 56 is filled with metal. Like the multiplexer 70 of FIG. 4, input A 72 or input B 74 may be selected by the via-configurable selection circuit of FIG. 5. However, the via-configurable selection circuit of FIG. 5 may be configured only once at manufacture by selectively filling one or more specific via sites 56 with metal to create a particular interconnection. As shown, the via site 56A may connect input A 72 to output 78 when selected. Via site 56B may connect input B 74 to output 78 when selected. Thus, by selecting whether to fill via sites 56A or 56B, the selected input (e.g., input A 72 or input B 74) may be routed to the output 78. While the via-configured selection circuit that can be manufactured based on the via-configurable selection circuit of FIG. 5 cannot be changed after manufacturing, it may take up substantially less die area than the multiplexer 70 of FIG. 4.

A structured application-specific integrated circuit (ASIC) is one example of an integrated circuit device 12 that can be customized using via-configuration at manufacturing. A structured ASIC is similar to a field programmable gate array (FPGA) in that a structured ASIC is highly customizable and contains similar circuit elements. A structured ASIC is different from an FPGA, though, in that it may only be configured once at manufacture by selectively filling vias of a via layer with metal and that user logic circuit elements of the structured ASIC may take up substantially less space than those of an FPGA.

Figure 6:
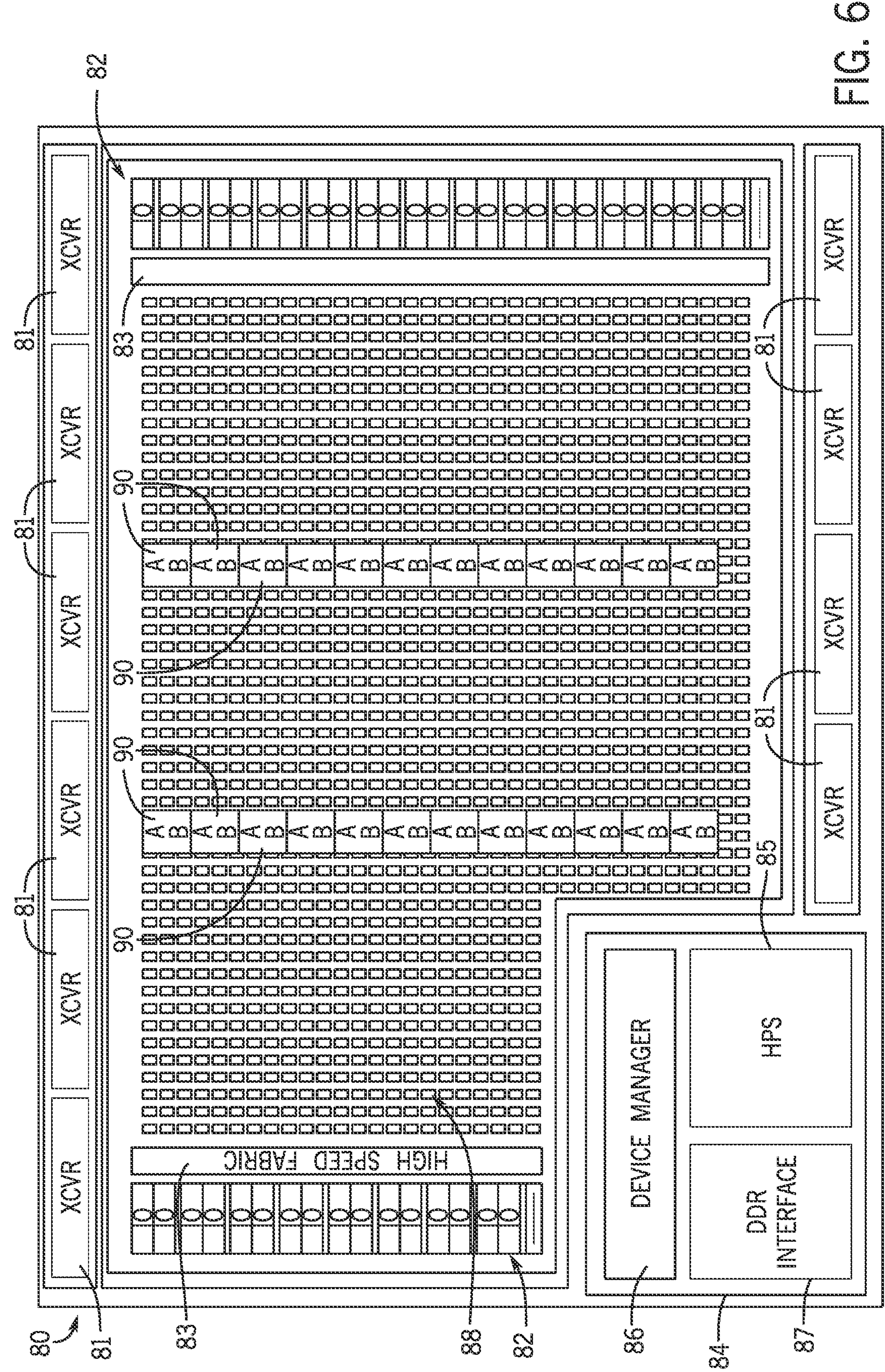
FIG. 6 is a block diagram of a structured ASIC containing embedded arithmetic circuitry, in accordance with an embodiment.

FIG. 6 provides one example of a structured ASIC 80. The periphery of the structured ASIC 80 may include transceiver (XCVR) blocks 81 and input/output (IO) blocks 82 to receive or transmit data. A high-speed fabric 83 may allow incoming or outgoing data to be routed to or from circuit elements on the structured ASIC 80. To provide compatibility with certain field programmable gate array (FPGA) products, the structured ASIC 80 may also include a region of hard circuitry 84. The hard circuitry 84 represents circuitry that is hardened (e.g., not formed using FPGA programmable logic circuitry) in some FPGA products. In the example of FIG. 6, the hard circuitry 84 includes a hard processing system (HPS) 85, a device manager 86, and a double-data rate (DDR) memory interface 87. The hard processing system (HPS) 85 may include any suitable processing circuitry, such as an x86 processor (e.g., an Intel® Atom® processor an Intel® Xeon® processor by Intel Corporation) or a reduced-instruction processor (e.g., a reduced instruction set computer (RISC), an Advanced RISC Machine (ARM) processor). The device manager 86 may correspond, for example, to a secure device manager (SDM) of any suitable FPGA by Intel Corporation. The double-data rate (DDR) memory interface 87 provides a monolithic interface to access memory external to the structured ASIC 80. Additionally or alternatively, the structured ASIC 80 may include other monolithic processing, memory or storage interface, or device control circuits than those shown here.

The core circuitry of the structured ASIC 80 is via-configured structured logic circuitry 88. The structured logic circuitry 88 represents a vast array of via-configurable logic circuitry and via-configurable routing circuitry that can be via-configured at manufacture to implement a system design. The structured logic circuitry 88 may be functionally similar to FPGA logic circuitry, except that the structured logic circuitry 88 may only be configured once at manufacture and user logic circuit elements of the structured logic circuitry 88 may take up considerably less space than those of an FPGA. Thus, just as with FPGA programmable logic circuitry, the structured logic circuitry 88 may be used to implement a near-infinite number of possible system designs.

In some system designs, the structured logic circuitry 88 may be via-configured to implement arithmetic circuits such as adders, multipliers, shift/sum blocks, and adder trees. Implementing arithmetic circuits using the structured logic circuitry 88, however, may use up a significant amount of the structured logic circuitry 88. Thus, as mentioned above, the structured ASIC 80 may also include embedded arithmetic blocks 90 (labeled in FIG. 6 as "AB") that have monolithic arithmetic circuits that may be used by the structured logic circuitry 88 to efficiently perform arithmetic operations without consuming additional structured logic circuitry 88. Indeed, the embedded arithmetic blocks 90 may be used to efficiently offload arithmetic calculations from the structured logic circuitry 88 to carry out a variety of use cases. These may include low-precision applications such artificial intelligence (AI) and machine learning (ML), traditional DSP applications such as finite impulse response (FIR) filters, and very high precision (and floating point) applications such as high-performance computing (HPC).

As mentioned above, adding FPGA-style DSP blocks to a structured array could unacceptably increase the relative cost for structured ASIC applications that do not make significant use of them. Thus, rather than represent a copy of a DSP block that may be found in many FPGA products, the embedded arithmetic blocks 90 may take the form of an embedded arithmetic array. In this way, the embedded arithmetic blocks 90 may be able to emulate the functions of any known embedded DSP block in combination with the structured logic circuitry 88. This may be possible because the routing density around the shoreline of an embedded arithmetic block 90 may be much greater in the structured ASIC 80 than may be possible using the programmable routing found in an FPGA DSP block manufactured using the same or a similar process node. Thus, the embedded arithmetic blocks 90, which may also be referred to as embedded ASIC blocks, may be much smaller than corresponding FPGA DSP blocks.

Often, the design and verification of an FPGA DSP block takes a substantial amount of time and effort. Consequently, a particular family of devices may generally use only one type of DSP block. To increase the efficiency of design and implementation, the embedded arithmetic blocks 90 may use arithmetic circuit components that are correct by design, meaning that the embedded arithmetic blocks 90 may be composed of pre-verified monolithic arithmetic components. For example, some pre-verified monolithic arithmetic components may come from commercially available IP. The design possibilities are then transferred to the act of combining these elements together using the embedded structured logic. Since only a subset of the arithmetic circuitry that may be found in the very complex FPGA DSP block is used in the embedded arithmetic blocks 90, the challenge and effort may be substantially contained. Indeed, this work can be done by the structured ASIC vendor. For example, a library of modes of the embedded arithmetic blocks 90 may be built and verified. This way, the most popular modes of the embedded arithmetic blocks 90 could be built first, or a particular mode requested by a customer. Therefore, only the effort actually involved in meeting a customer specification could be carried out at the time of customer design—rather than speculative effort years in advance of the device being ready. Customers may also assemble their own modes, or even modes not envisioned by the vendor.

The embedded arithmetic blocks 90 may all have the same arithmetic circuits or may vary across different parts of the structured ASIC 80. Moreover, different versions of the structured ASIC 80 may use different versions of embedded arithmetic blocks 90. There may be any suitable number of embedded arithmetic blocks 90 in the structured ASIC 80. Some versions of the structured ASIC 80 may have only a few (e.g., 1, 5, 10) embedded arithmetic blocks 90 while other versions may have substantially more (50, 100, 200, 500, 1000 or more) embedded arithmetic blocks 90. A number of different possible embedded arithmetic blocks 90 will be discussed further below.

Figure 7:
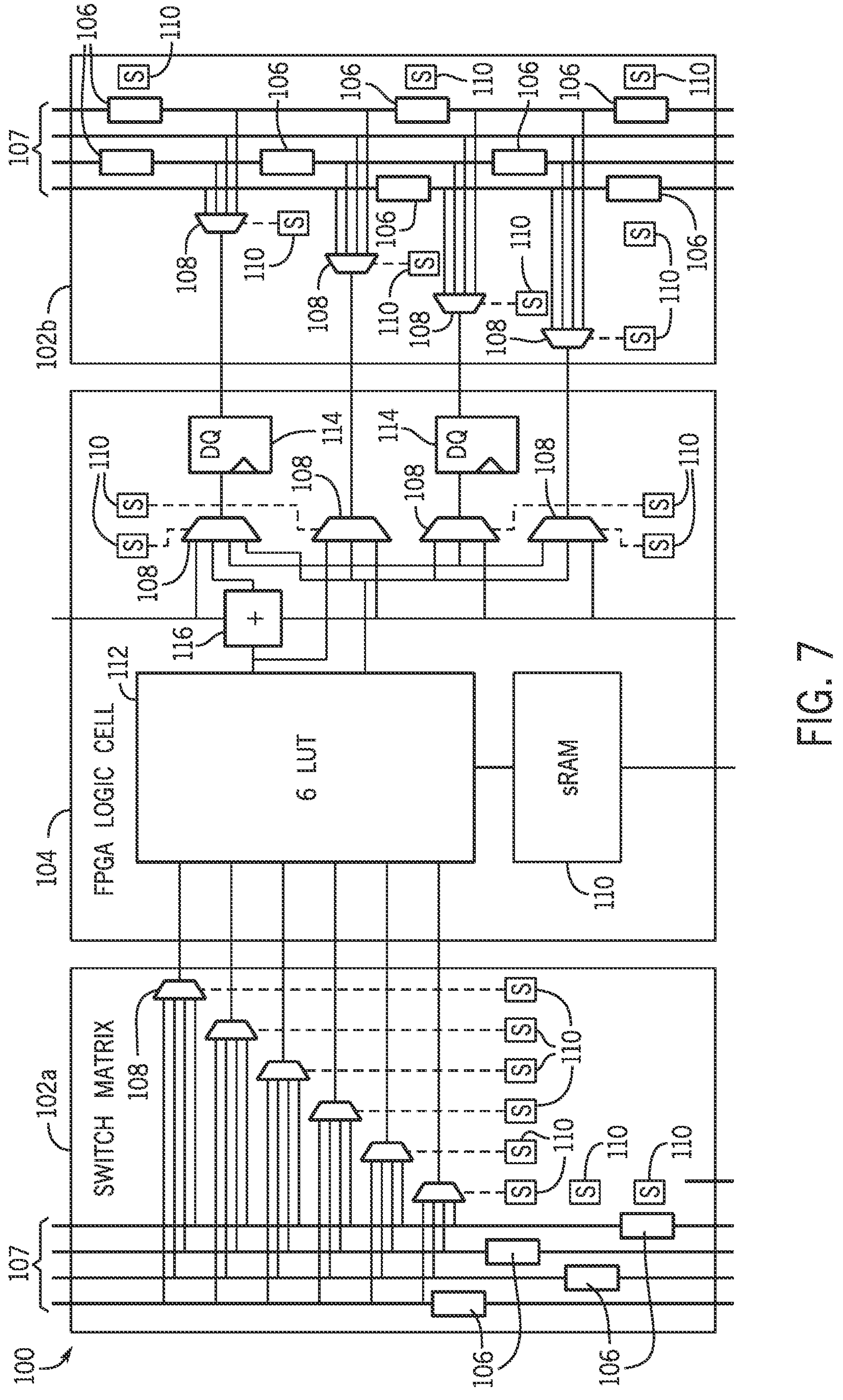
FIG. 7 is a block diagram illustrating logic that may be found in an FPGA, in accordance with an embodiment.
Figure 8:
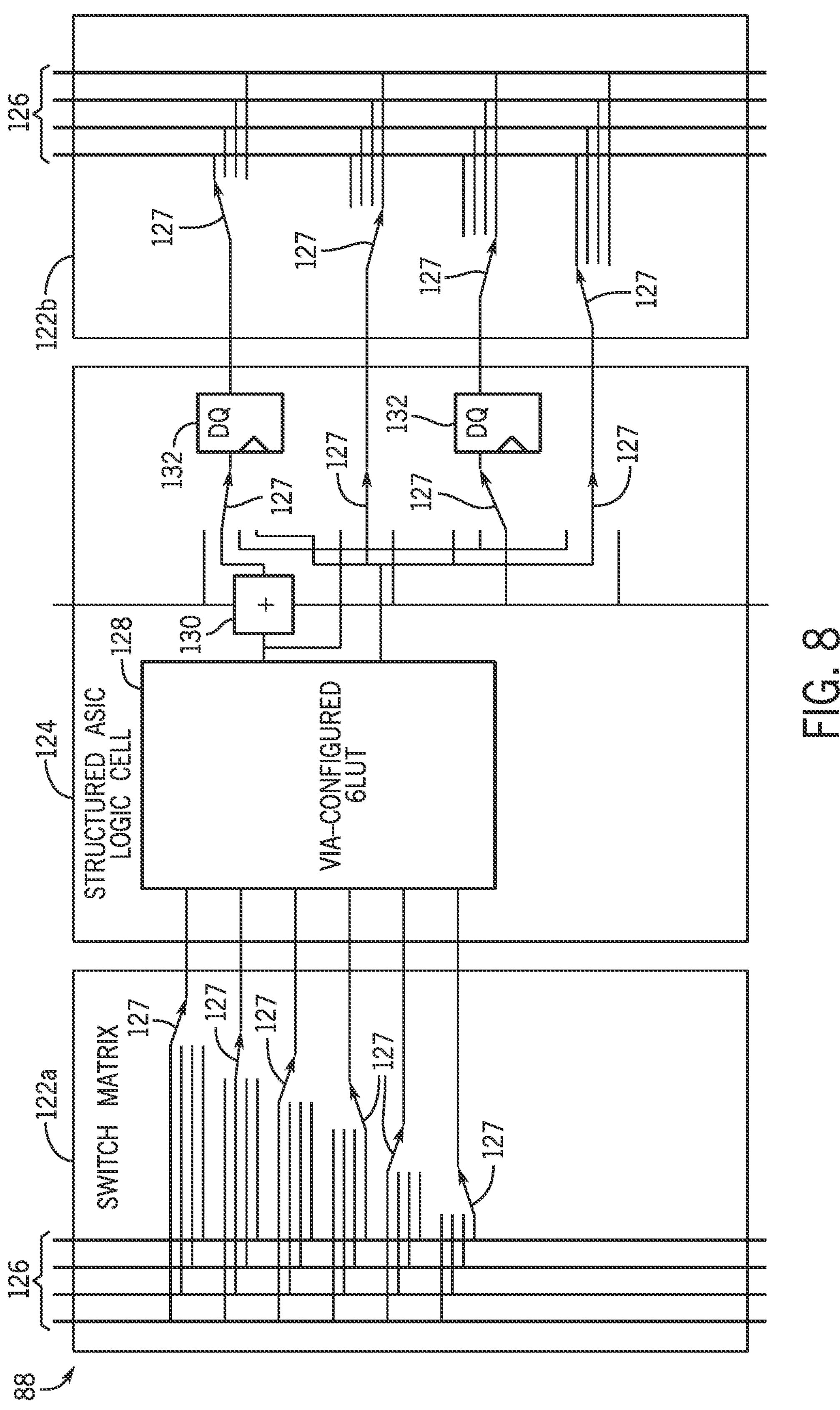
FIG. 8 is a block diagram illustrating logic corresponding to that of FIG. 7 that may be via-configured in a structured ASIC, in accordance with an embodiment.

Before continuing, FIGS. 7 and 8 may be used to show how the structured logic circuitry 88 compares to field-programmable gate array (FPGA) programmable logic circuitry. FIG. 7 illustrates a segment of FPGA programmable logic circuitry 100, which may include a switch matrix 102*a* and a switch matrix 102*b* that respectively feed data into and out from an FPGA logic cell 104. While FIG. 7 illustrates only a few signal paths 107, there may be many more in an actual implementation. The FPGA programmable logic circuitry 100 may extend relatively long distances such that repeater circuits 106 may be used to boost data signals traveling along signal paths 107 through the switch matrix 102*a* and the switch matrix 102*b*, albeit at the cost of some signal delay and die space. Multiplexers 108 may selectively connect the signal paths 107 into and out of the FPGA logic cell 104. Configuration random access memory (CRAM), represented as sRAM (S) 110 in FIG. 7, configures the selection of the multiplexers 108.

In the FPGA logic cell 104, a lookup table 112 may receive data from the switch matrix 102*a* and output a result based on a configuration of the lookup table 112 defined by the sRAM 110. In essence, the lookup table 112 may implement a truth table that effectively emulates logic circuitry that may be implemented in a desired system design. Other circuitry of the FPGA logic cell 104 may include registers (e.g., DQ flip-flops 114), a carry adder 116 to add a carry bit from an adjacent FPGA logic cell 104 to the result of the lookup table 112, and additional multiplexers 108 configured by sRAM (S) 110.

FIG. 8 represents similar circuitry that may be found in a segment of the structured logic circuitry 88. Because the structured logic circuitry 88 is via-configured rather than field-programmable, however, the structured logic circuitry 88 may avoid certain multiplexer circuitry as well as its corresponding configuration memory. Like the FPGA circuitry of FIG. 7, the structured logic circuitry 88 may include a switch matrix 122*a* and a switch matrix 122*b* that respectively feed data into a structured ASIC logic cell 124. While FIG. 8 illustrates only a few signal paths 126, there may be many more in an actual implementation. Because the structured logic circuitry 88 is via-configured, it may not extend quite such long distances as the FPGA programmable logic circuitry 100. As such, fewer or no repeater circuits may be used to boost data signals traveling along the signal paths 126 through the switch matrix 122*a* and the switch matrix 122*b*, thereby reducing signal delay and saving die space. Instead of multiplexers, via-configured switches 127 may selectively connect the signal paths 126 into and out of the structured ASIC logic cell 124. The via-configured switches 127 may be understood to operate in a manner like that described above with reference to FIG. 5. In effect, by selectively filling certain vias in one or more via layers during manufacture, different signal paths 126 may be electrically connected to the structured ASIC logic cell 124. The via-configured switches 127 may take up less die space than the multiplexer circuits, while also avoiding the use of configuration random access memory (CRAM) that would be used to program such multiplexers.

The structured ASIC logic cell 124 may operate similarly to the FPGA logic cell 104, but may take up less space because it contains a via-configured lookup table 128 instead of a programmable lookup table. The via-configured lookup table 128 may be configured once during manufacture by selectively filling certain vias in one or more via layers. Like the lookup table 112 of FIG. 7, the via-configured lookup table 128 may receive data from the switch matrix 122*a* and output a result based on a configuration of the lookup table 128 defined by its particular via configuration. Thus, the lookup table 128 may implement a truth table that effectively emulates logic circuitry that may be implemented in a desired system design. Other circuitry of the structured ASIC logic cell 124 may include a carry adder 130 to add a carry bit from an adjacent structured ASIC logic cell 124 to the result of the lookup table 128, registers (e.g., DQ flip-flops 132), and additional via-configured switches 127.

The tremendous configurability of the structured logic circuitry 88 allows the structured logic circuitry 88 to implement a vast range of possible system designs. In some system designs, the structured logic circuitry 88 may be via-configured to implement arithmetic circuits such as adders, multipliers, shift/sum blocks, and adder trees. Implementing arithmetic circuits using the structured logic circuitry 88, however, may use up a significant amount of the structured logic circuitry 88. Accordingly, the structured ASIC 80 may also include embedded arithmetic blocks 90 that have monolithic arithmetic circuits that may be used by the structured logic circuitry 88 to efficiently perform arithmetic operations without consuming additional structured logic circuitry 88.

Figure 9:
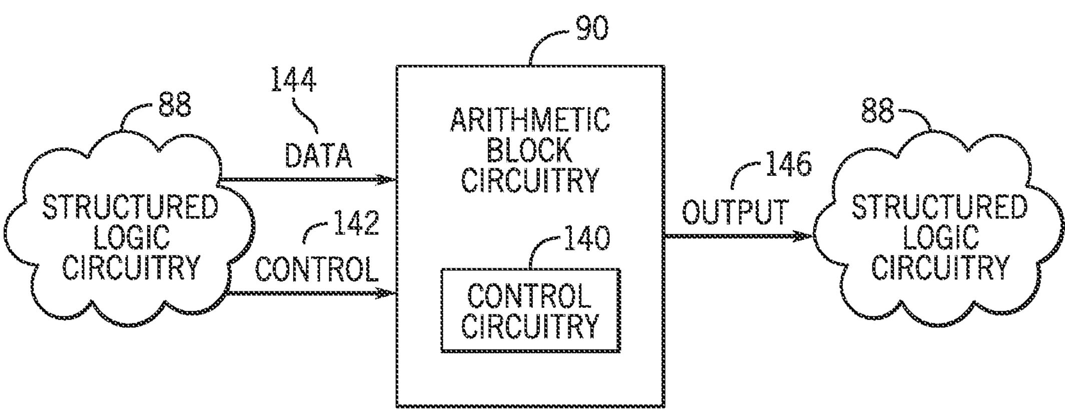
FIG. 9 is a block diagram illustrating an example of an arithmetic block that may be embedded in a structured ASIC, in accordance with an embodiment.

The embedded arithmetic blocks 90 may include a variety of different types of arithmetic circuitry to ease the burden of performing arithmetic computations on the structured logic circuitry 88. As shown in FIG. 9, an embedded arithmetic block 90 may include control circuitry 140 in addition to any associated monolithic arithmetic circuits such as those illustrated in FIGS. 10-18. The control circuitry 140 may represent any suitable state machine or processor that may receive a control signal 142 from the structured logic circuitry 88 and, based on the control signal 142, control the operation of the monolithic arithmetic circuits of the embedded arithmetic block 90. The structured logic circuitry 88 may also provide data 144. Based on the control signal 142 and the data 144, the embedded arithmetic block 90 may perform desired arithmetic computations on the data 144 and provide the result(s) as an output 146 back to the structured logic circuitry 88. It should be noted that the structured logic circuitry 88 on each side of the arithmetic block circuitry 90 may have different functionalities. For example, the structured logic circuitry 88 on sending the control signal 142 and the data signal 144 may have a different functionality than the structured logic circuitry 88 receiving the output 146. In this way, the structured logic circuitry 88 may effectively offload arithmetic calculations and avoid dedicating large parts of the structured logic circuitry 88 to perform those computations.

The embedded arithmetic block 90 may also do so using a lower total area than that of a corresponding FPGA DSP block. Indeed, the footprint of the embedded arithmetic block 90 may also be smaller than that of an FPGA DSP block formed using the same lithography process node, but the connectivity of the embedded arithmetic block 90 may be much larger. In some cases, the embedded arithmetic block 90 may have several hundred input wires (e.g., 300, 400, 500, 600, 700, 800) and several hundred output wires (e.g., 300, 400, 500, 600, 700, 800).

Moreover, while the embedded arithmetic block 90 is shown to the include control circuitry 140 in the form of a monolithic processor or state machine built into the embedded arithmetic block 90, this may also vary in different designs. For example, the control circuitry 140 may be formed entirely out of the structured logic circuitry 88. In another example, the control circuitry 140 may be formed partly out of the structured logic circuitry 88 and partly as a monolithic circuit in the embedded arithmetic block 90. In some embodiments, the control circuitry 140 may be via-configured or may be configurable by signals received from the structured logic circuitry 88.

As mentioned above, FIGS. 10-18 provide a non-limiting set of examples of groups of monolithic arithmetic circuits that may be a part of the embedded arithmetic block 90. These examples are intended to illustrate potential monolithic arithmetic circuits that may be a part of the embedded arithmetic block 90 and are not intended to be exhaustive.

The various monolithic arithmetic circuits that may be used in the embedded arithmetic blocks 90, such as adders, multipliers, shift/sum blocks, or adder trees, may be designed to operate on any suitable data format or formats. For example, the monolithic arithmetic circuits may operate on fixed-point data (e.g., four-bit, eight-bit, 10-bit, 16-bit, 24-bit, 27-bit, or 32-bit integer values, to name just a few) or any suitable fixed-point format (e.g., INT8, INT9, INT10, INT18, or INT27, to name just a few). Additionally or alternatively, the monolithic arithmetic circuits may operate on floating-point data, such as a single-precision floating point value (e.g., FP32), a double-precision floating point value (e.g., FP64), floating-point values in other formats such as bfloat24 format (e.g., a value having one sign bit, eight exponent bits, and sixteen implicit (fifteen explicit) mantissa bits), bfloat16 format (e.g., a value having one sign bit, eight exponent bits, and seven explicit mantissa bits), bfloat20 format (e.g., a value having one sign bit, eight exponent bits, and eleven explicit mantissa bits), or any suitable format. In embodiments of the integrated circuit 12 that include multiple different versions of a similar embedded arithmetic block 90, some embedded arithmetic blocks 90 may operate on data of a first format (e.g., fixed-point) while other embedded arithmetic blocks 90 may operate on data of a second format (e.g., floating-point). Moreover, in some embodiments of the embedded arithmetic block 90, different monolithic arithmetic circuits in the same embedded arithmetic block 90 may operate using different data formats (e.g., one set of adders and multipliers may operate on fixed point data while another set of adders and multipliers may operate on floating point data).

Figure 10:
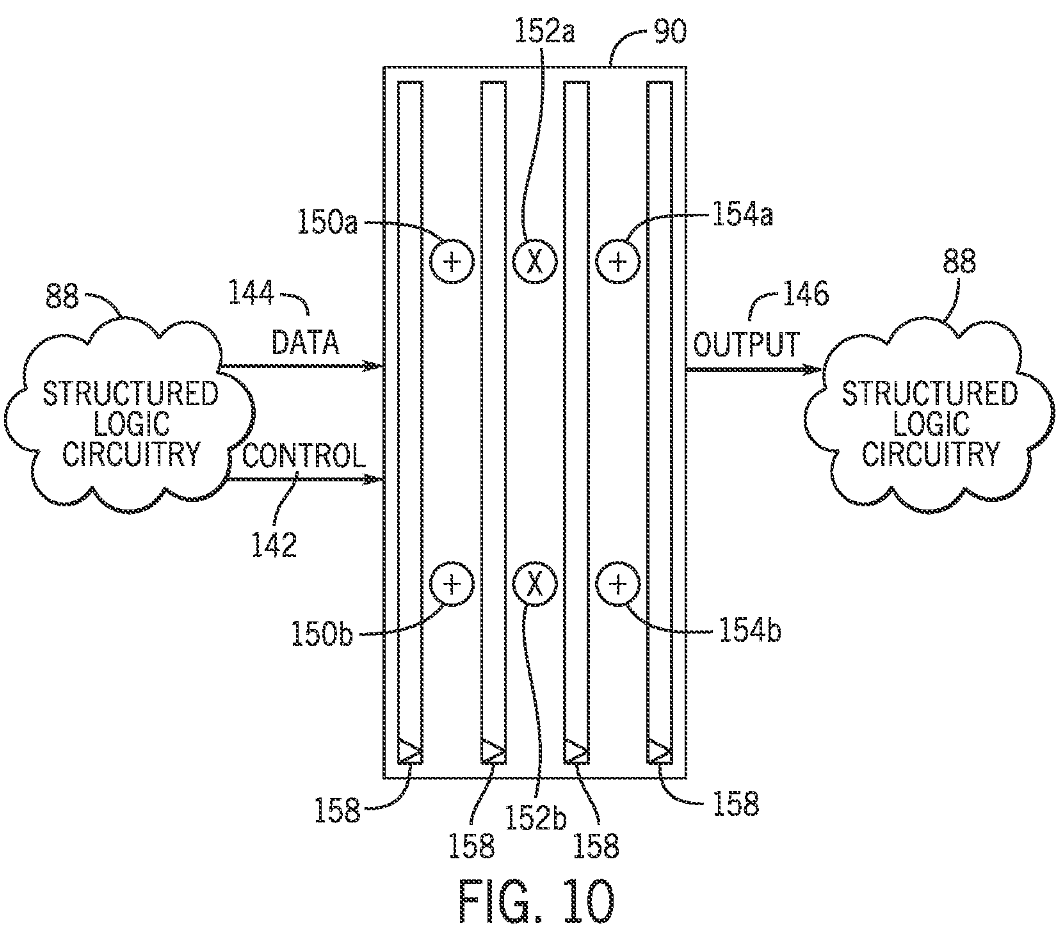
FIG. 10 is a block diagram showing a particular example of the arithmetic block that includes registers, pre-adders, multipliers, and post-adders, in accordance with an embodiment.

FIG. 10 illustrates an example of the embedded arithmetic block 90 that contains monolithic arithmetic circuitry useful to perform many computations that can be performed by an FPGA DSP block, such as Finite Impulse Response (FIR) and Fast Fourier Transform (FFT). These are, in order, pre-adders 150*a* and 150*b*, multipliers 152*a* and 152*b*, and post-adders 154*a* and 154*b*. Registers 158 may store data before, between, or after arithmetic operations involving the monolithic arithmetic circuits (here, the pre-adders 150*a* and 150*b*, multipliers 152*a* and 152*b*, and post-adders 154*a* and 154*b*). As in FIG. 9, the embedded arithmetic block may receive a control signal 142 and data 144. Based on the control signal 142 and the data 144, the embedded arithmetic block 90 may perform desired arithmetic computations on the data 144 and provide the result(s) as an output 146 back to the structured logic circuitry 88.

Figures 11, 12:
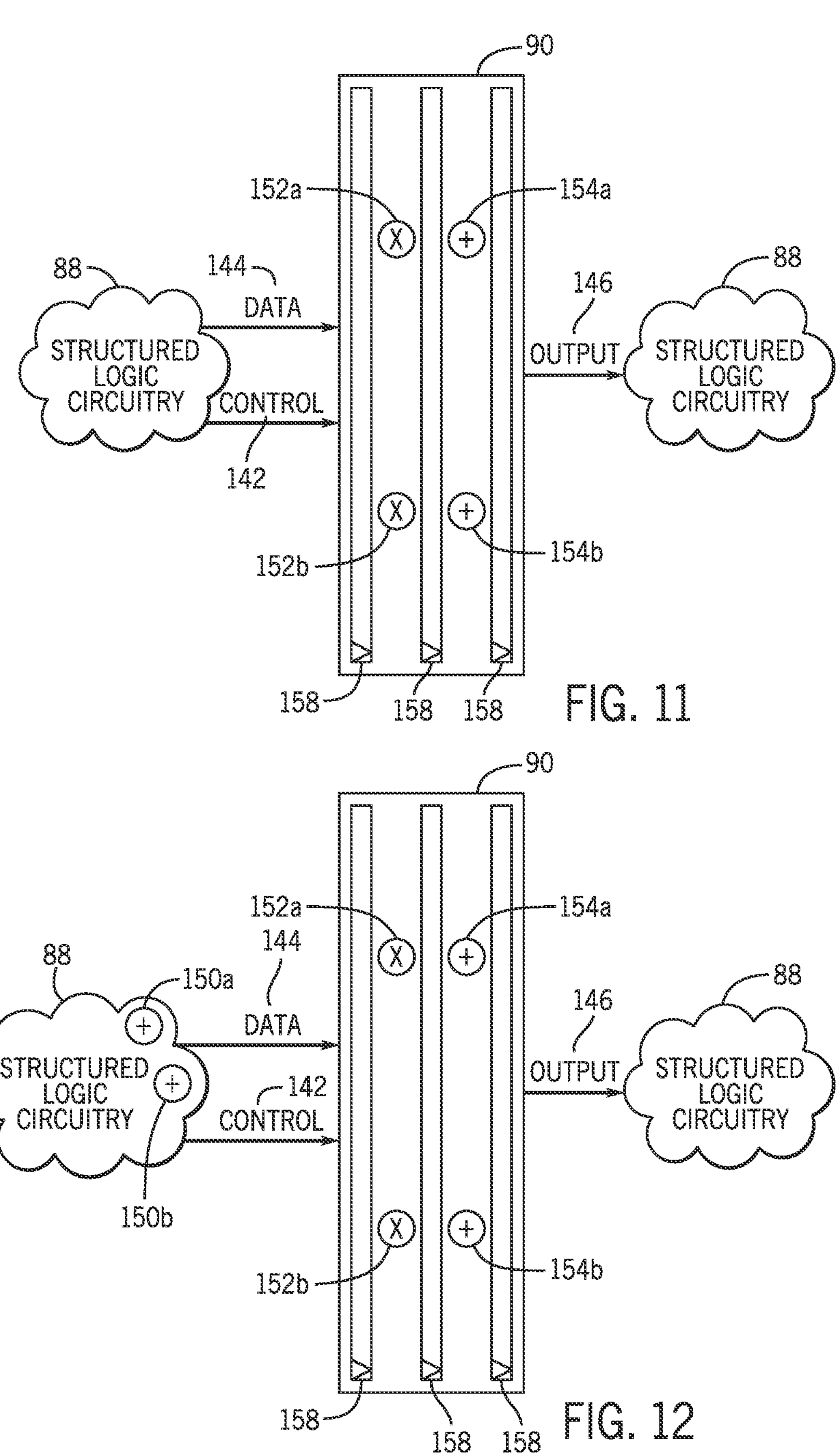
FIG. 11 is a block diagram showing a particular example of the arithmetic block that includes registers, multipliers, and post-adders, in accordance with an embodiment.
FIG. 12 is a block diagram showing an example of using the arithmetic block of FIG. 11 in combination with structured logic circuitry to achieve similar functionality to the arithmetic block of FIG. 10, in accordance with an embodiment.

Removing some of the monolithic arithmetic circuits may reduce the amount of die area taken up by the embedded arithmetic blocks 90. FIG. 11 illustrates an example of the embedded arithmetic block 90 that is the same as that of FIG. 10, except that it lacks the pre-adders 150*a* and 150*b* and a corresponding set of registers 158. Even so, as illustrated by FIG. 12, the same functionality as provided by the circuitry of FIG. 10 may be obtained by implementing the pre-adders 150*a* and 150*b* in the structured logic circuitry 88 instead of as monolithic arithmetic elements in the embedded arithmetic block 90.

Likewise, similar examples of the embedded arithmetic block 90 may remove post-adders 154*a* and 154*b* from the circuitry of FIG. 10 (while retaining the pre-adders 150*a* and 150*b* or removing them, as well). If a system design using such embedded arithmetic blocks 90 involves a computation that calls for post-adders, the post-adders could be constituted in the structured logic circuitry 88 that receives the output of the embedded arithmetic block 90.

Figures 13, 14:
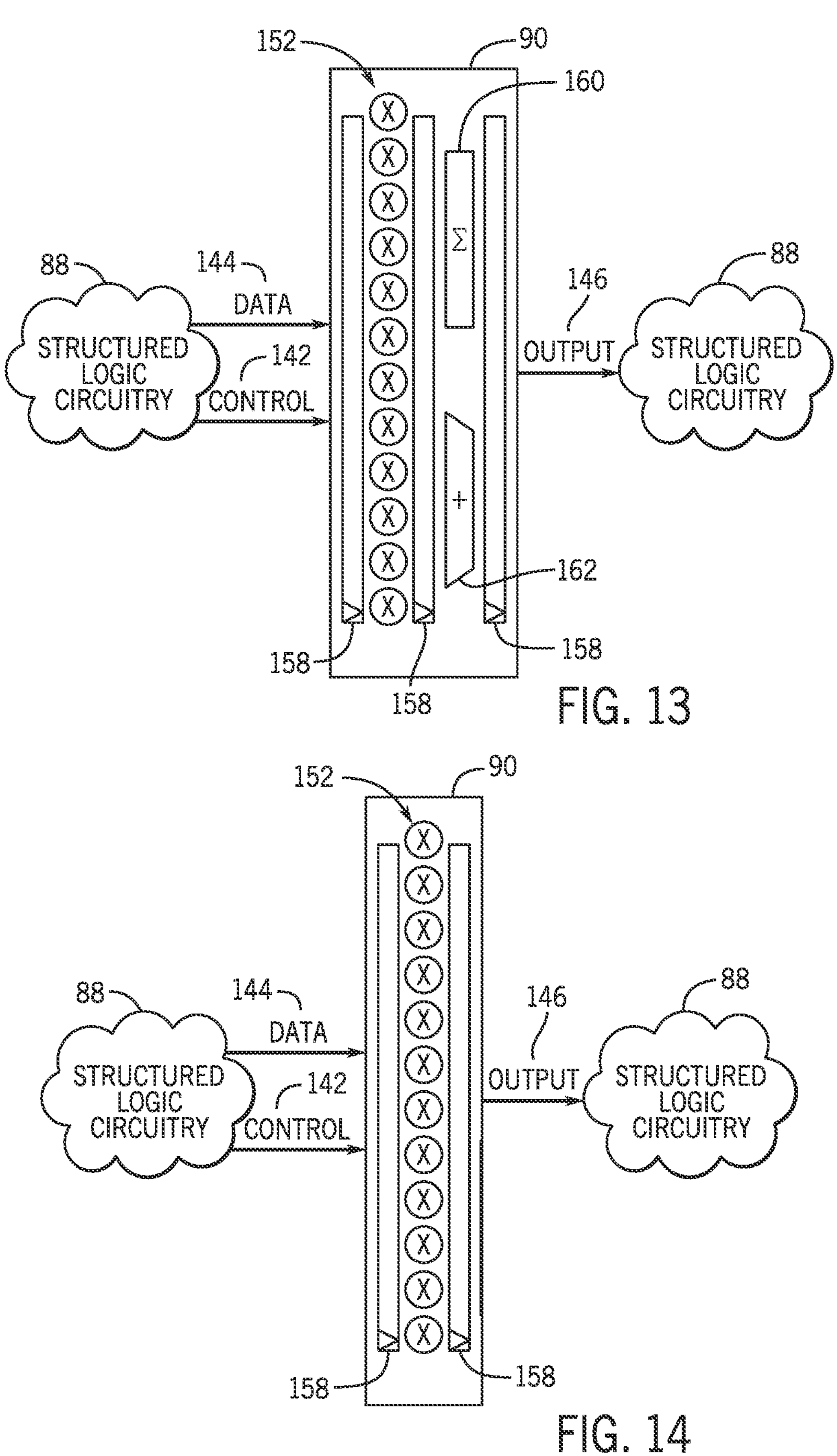
FIG. 13 is a block diagram showing a particular example of the arithmetic block that includes registers, an array of multipliers, a shift/sum block, and an adder tree, in accordance with an embodiment.
FIG. 14 is a block diagram showing a particular example of the arithmetic block that includes registers and an array of multipliers, in accordance with an embodiment.

As noted above, the structured logic circuitry 88 of a structured ASIC may have significantly more connectivity into an embedded arithmetic block 90 than FPGA programmable logic circuitry would have to an FPGA DSP block. This additional connectivity may be leveraged to enable very large-scale computation. For example, FIG. 13 illustrates an example of the embedded arithmetic block 90 that contains an array of multipliers 152. The embedded arithmetic block may receive a control signal 142 and data 144. Based on the control signal 142 and the data 144, the embedded arithmetic block 90 may perform desired arithmetic computations on the data 144 and provide the result(s) as an output 146 back to the structured logic circuitry 88.

In the example of FIG. 13, the array of multipliers 152 may represent an array of many relatively smaller multipliers (e.g., 8×8, 9×9, 10×10, or the like). This may stand in contrast to a normal FPGA context, in which providing full access to a large number of multipliers may not be possible.

For example, 16 INT10 multipliers may involve 320 pins, which is about three times that of the largest port size of a regular FPGA DSP, but only about half the number available to some embedded arithmetic blocks 90 for a structured ASIC.

Two post-multiplier structures are provided in the example of FIG. 13. One is a shift/sum block 160 that provides a set of shifting and summation functions, which can be used to build larger multipliers (e.g., INT18 multipliers, or INT27 multipliers), which can in turn be used as the core of a floating-point multiplier. The other of the structures is an adder tree 162, which can build dot products. This may be useful for AI applications. When the embedded arithmetic block 90 of FIG. 13 is used to build an FP multiplier, the input signal conditioning, output rounding and error and exception detection and signaling, as well as the exponent datapath, can all be implemented in the structured logic circuitry 88. Also, integer systems, such as the accumulation for FIR filters, can be implemented in the structured logic circuitry 88. The control of the shift/sum block 160 inside the embedded arithmetic block 90 can either be fixed or made programmable by some control logic circuitry in the embedded arithmetic block 90 or in the structured logic circuitry 88. This way, an application can support multiple different multiplier precisions. Also, because of the large amount of output connectivity, the outputs of the adder tree 162 and shift/sum block 160 can both be made available to the structured logic circuitry 88 at the same time.

Figures 15, 16:
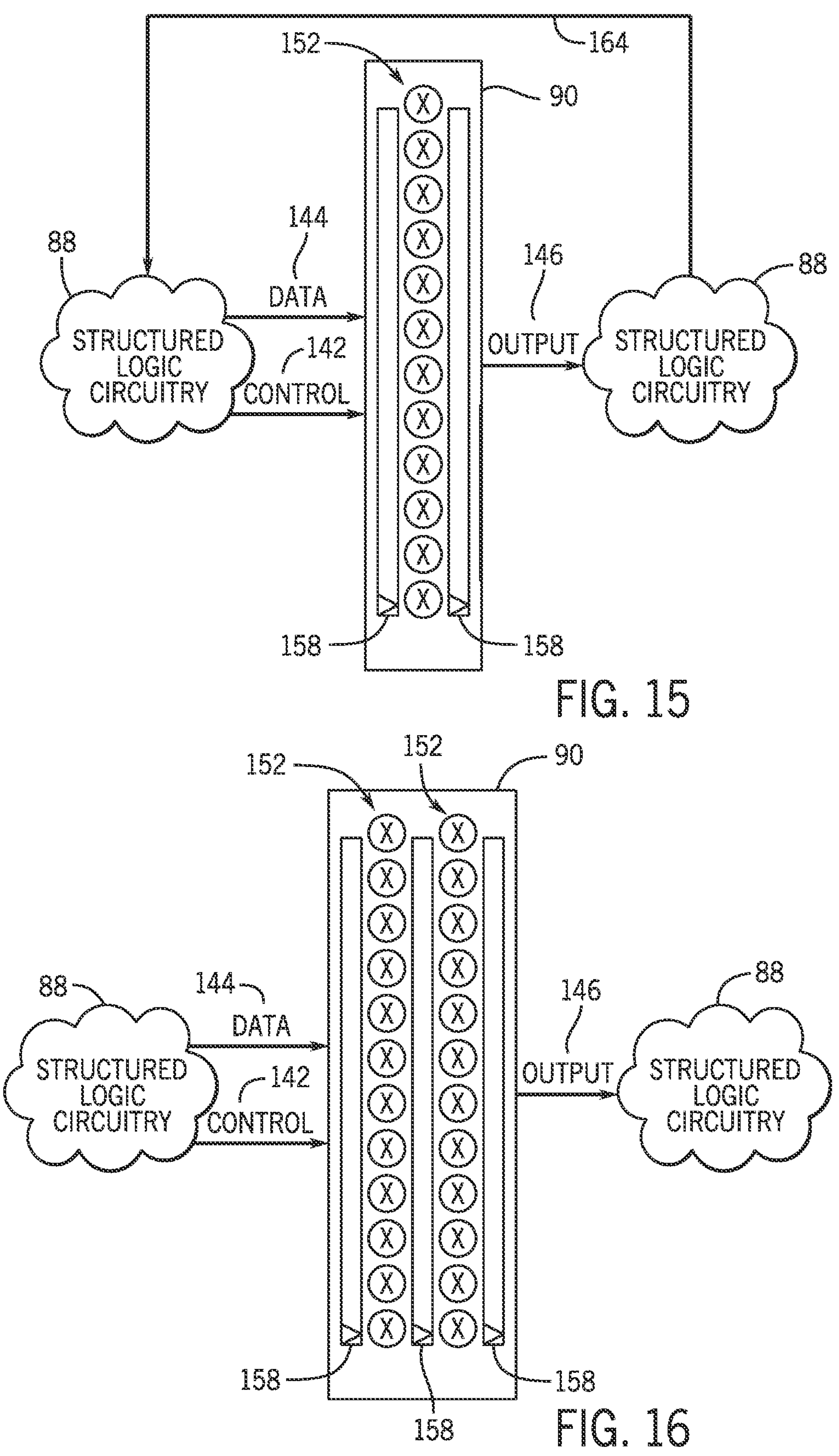
FIG. 15 is a block diagram showing a particular example of the arithmetic block of FIG. 14 and a feedback path through the structured logic, in accordance with an embodiment.
FIG. 16 is a block diagram showing a particular example of the arithmetic block that includes registers and several arrays of multipliers, in accordance with an embodiment.

In another example, shown in FIG. 14, a single column of multipliers 152 may be implemented in an embedded arithmetic block 90. More structured logic circuitry 88 may be involved in this case to implement some application functions, but the embedded arithmetic block 90 would be very small. Some computational applications may feed values output by an embedded arithmetic block 90 back into the arithmetic block 90 for additional computations. As shown in FIG. 15, which also illustrates the embedded arithmetic block 90 of FIG. 14, a feedback path 164 may be implemented in the structured logic circuitry 88 to do this. Other elements shown in FIGS. 14 and 15 but not described here may operate in the same manner as like elements previously discussed with reference to other FIGS.

In an example shown in FIG. 16, an embedded arithmetic block 90 may include multiple columns of multipliers 152. These could be arranged as tensors (physically shown in FIG. 15), where one input is routed to multiple multipliers 152. Additionally or alternatively, if enough inputs were available for the number of multipliers 152 for a particular application, each multiplier 152 could have unique inputs. With respect to the output of FIG. 16, if many tensors were desired, each tensor may have its own adder tree implemented as monolithic circuit elements in the embedded arithmetic block 90 or implemented in the structured logic circuitry 88. Cascading of the adder trees may be done using the structured logic circuitry 88. Other elements shown in FIG. 16 but not described here may operate in the same manner as like elements previously discussed with reference to other FIGS.

Figures 17, 18:
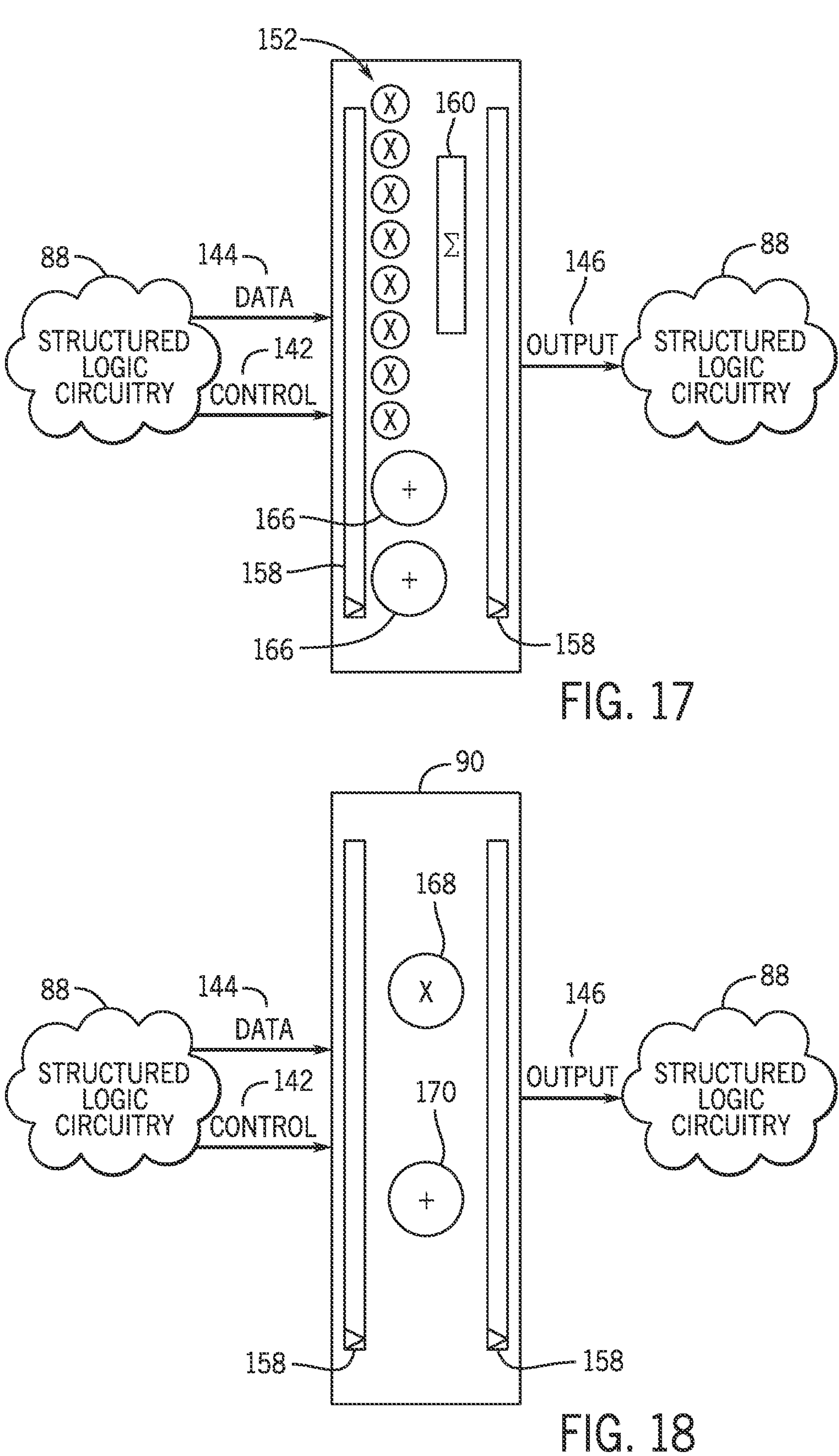
FIG. 17 is a block diagram showing a particular example of the arithmetic block that includes registers, an array of multipliers, a shift/sum block, and large adders, in accordance with an embodiment.
FIG. 18 is a block diagram showing a particular example of the arithmetic block in the form of a high-performance computing (HPC) block that includes a large floating-point (e.g., FP64) multiplier and a large floating-point (e.g., FP64) adder, in accordance with an embodiment.

In another example, shown in FIG. 17, floating point adders 166 may be included as components in the embedded arithmetic block 90. This may be done in conjunction with a column of multipliers 152, which may also include shift/sum block(s) 160 or adder tree block(s) (not shown). What is different about the floating-point adders 166 is that they may be directly accessed from outside the embedded arithmetic block 90, including both inputs and outputs. Construction of systems using the floating-point adders 166 may take place completely using the structured logic circuitry 88 and the monolithic floating-point adders 166 in the embedded arithmetic block 90. As these elements have standalone functionality—multipliers, floating-point adders, etc.—commercially available IP can be used. This may allow the rapid construction of these blocks. This will allow both the emulation of any existing FPGA DSP functionality, as well as any suitable customer-defined modes to be constructed. Although the floating-point adder 166 is provided monolithically here, a floating-point multiplier may be constructed from fixed point adders (which may be individually provided monolithically). Other elements shown in FIG. 17 but not described here may operate in substantially the same manner as like elements previously discussed with reference to other FIGS.

Many other combinations are also possible. FIG. 18 shows an embedded arithmetic block 90 that may operate as a high-performance compute (HPC) block. The embedded arithmetic block 90 of FIG. 18 includes a FP64 multiplier 168 and a FP64 adder 170, which may be independently accessed from outside the block. This arrangement may involve 256 inputs and 128 outputs, which is not currently possible in the FPGA context. Additionally or alternatively, the embedded arithmetic block 90 may include large integer multipliers or large integer adders (e.g., of a data width comparable to that of FP64). Other elements shown in FIG. 18 but not described here may operate in substantially the same manner as like elements previously discussed with reference to other FIGS.

Figure 19:
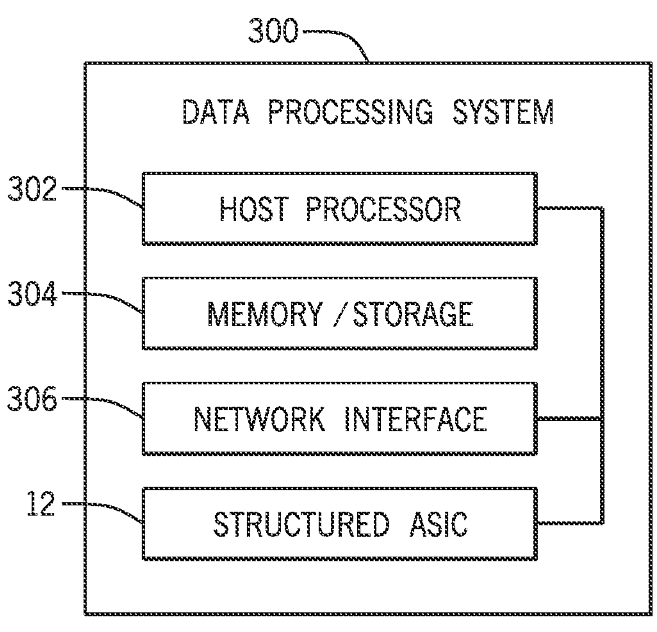
FIG. 19 illustrates a block diagram of a data processing system that may include a structured ASIC that makes use of embedded arithmetic blocks, in accordance with an embodiment.

With the foregoing in mind, the integrated circuit device 12 may be a part of a data processing system or may be a component of a data processing system that may benefit from using the techniques discussed herein. For example, the integrated circuit device 12 may be a component of a data processing system 300, shown in FIG. 19. The data processing system 300 includes a host processor 302, memory and/or storage circuitry 304, a network interface 306, and the integrated circuit device 12 in the form of a structured ASIC. The data processing system 300 may include more or fewer components (e.g., electronic display, user interface structures, application-specific integrated circuits (ASICs)). In some cases, a plurality of integrated circuit devices 12 may be components of the data processing system 300. For example, each of the plurality of integrated circuit devices 12 may include a particular via configuration for a particular circuit.

The host processor 302 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 300 (e.g., to perform machine learning, video processing, voice recognition, image recognition, data compression, database search ranking, bioinformatics, network security pattern identification, spatial navigation, or the like). The memory and/or storage circuitry 304 may include random access memory (RAM), read-only memory (ROM), one or more hard drives, flash memory, or the like. The memory and/or storage circuitry 304 may be considered external memory to the integrated circuit device 12 and may hold data to be processed by the data processing system 300 and/or may be internal to the integrated circuit device 12. In some cases, the memory and/or storage circuitry 304 may also store configuration programs for programming a programmable fabric of the integrated circuit device 12. The network interface 306 may permit the data processing system 300 to communicate with other electronic devices. The data processing system 300 may include several different packages or may be contained within a single package on a single package substrate.

In one example, the data processing system 300 may be part of a data center that processes a variety of different requests. For instance, the data processing system 300 may receive a data processing request via the network interface 306 to perform machine learning, video processing, voice recognition, image recognition, data compression, database search ranking, bioinformatics, network security pattern identification, spatial navigation, or some other specialized task. The host processor 302 may cause a programmable logic fabric of the integrated circuit device 12 to be programmed with a particular accelerator related to the requested task. For instance, the host processor 302 may instruct that configuration data be stored on the memory and/or storage circuitry 304 or cached in sector-aligned memory of the integrated circuit device 12 to be programmed into the programmable logic fabric of the integrated circuit device 12. The configuration data may represent a circuit design for a particular accelerator function relevant to the requested task.

Figure 20:
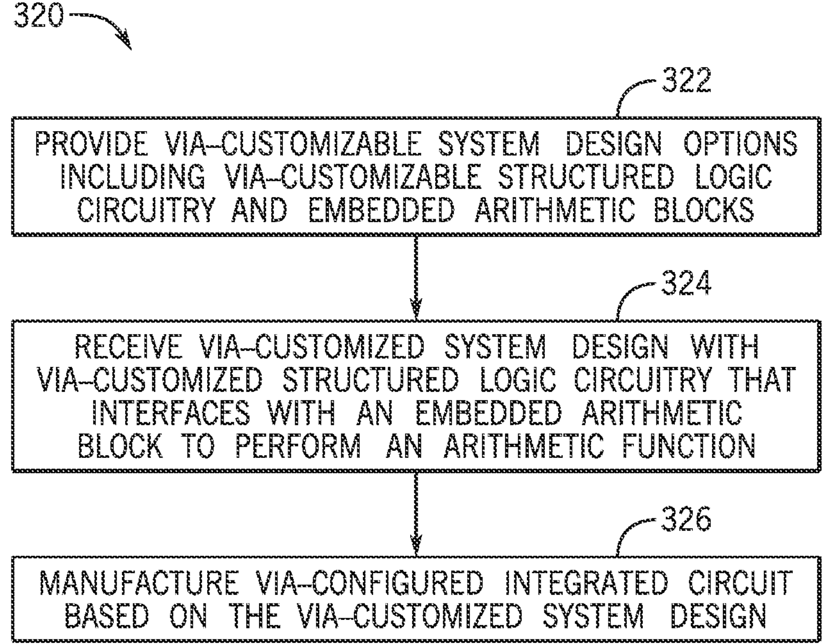
FIG. 20 is a flowchart of a method for manufacturing a via-configured structured ASIC, in accordance with an embodiment.

As indicated above, the integrated circuit device 12 in the form of a structured ASIC provides tremendous customizability due to the via-configurability of the structured logic circuitry 88. The use of embedded arithmetic blocks 90 in concert with the structured logic circuitry 88 allows the integrated circuit 12 to very efficiently perform arithmetic computations without consuming excessive structured logic circuitry 88. To manufacture such an integrated circuit device 12, as represented by a flowchart 320 of FIG. 20, a structured ASIC vendor may provide to a customer via-customizable system design options with via-customizable structured logic circuitry and embedded arithmetic blocks that include at least one monolithic arithmetic circuit (block 322). The customer may generate a via-customized system design that includes via-configured structured logic circuitry that interfaces with an embedded arithmetic block to perform an arithmetic function. The vendor may receive the via-customized system design (block 324). Using the via-customized system design, the vendor may generate corresponding customized photomask(s) that selectively fill vias and use them to manufacture a via-configured integrated circuit that includes via-configured structured logic circuitry that interfaces with the embedded arithmetic block to perform the arithmetic function (block 326).

The processes and devices of this disclosure may be incorporated into any suitable circuit. For example, the processes and devices may be incorporated into numerous types of devices such as microprocessors or other integrated circuits. Example integrated circuits include programmable array logic (PAL), programmable logic arrays, (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application-specific standard products (ASSPs), application-specific integrated circuits (ASICs), and microprocessors, just to name a few.

Moreover, while the method operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The following example embodiments provide a non-limiting set of examples that may follow from this disclosure.

EXAMPLE EMBODIMENT 1. An integrated circuit comprising:

via-configured structured logic circuitry; and an embedded arithmetic block that interfaces with the via-configured structured logic circuitry to perform an arithmetic function, wherein the embedded arithmetic block comprises a plurality of monolithic arithmetic circuits.

EXAMPLE EMBODIMENT 2. The integrated circuit of example embodiment 1, wherein the via-configured structured logic circuitry comprises a plurality of via-configured lookup tables.

EXAMPLE EMBODIMENT 3. The integrated circuit of example embodiment 1, wherein the via-configured structured logic circuitry comprises a via-configured feedback path that couples an output of the embedded arithmetic block with an input of the embedded arithmetic block.

EXAMPLE EMBODIMENT 4. The integrated circuit of example embodiment 1, wherein the embedded arithmetic block comprises a multiplier.

EXAMPLE EMBODIMENT 5. The integrated circuit of example embodiment 4, wherein the embedded arithmetic block comprises a pre-adder to perform an addition function on data prior to multiplication by the multiplier.

EXAMPLE EMBODIMENT 6. The integrated circuit of example embodiment 4, wherein the via-configured structured logic circuitry comprises structured logic circuitry that has been via-configured to form a pre-adder to perform an addition function prior to the embedded arithmetic block.

EXAMPLE EMBODIMENT 7. The integrated circuit of example embodiment 4, wherein the embedded arithmetic block comprises a post-adder to perform an addition function using outputs of the multiplier.

EXAMPLE EMBODIMENT 8. The integrated circuit of example embodiment 4, wherein the via-configured structured logic circuitry comprises structured logic circuitry that has been via-configured to form a post-adder to perform an addition function using outputs of the multiplier.

EXAMPLE EMBODIMENT 9. The integrated circuit of example embodiment 1, wherein the embedded arithmetic block comprises via-configured control circuitry that controls an operation of the plurality of monolithic arithmetic circuits.

EXAMPLE EMBODIMENT 10. The integrated circuit of example embodiment 1, wherein the embedded arithmetic block comprises a higher routing density around a shoreline of the embedded arithmetic block than that of a digital signal processing (DSP) block of a field-programmable gate array (FPGA) manufactured using the same process node.

EXAMPLE EMBODIMENT 11. The integrated circuit of example embodiment 1, wherein the embedded arithmetic block, in concert with the via-configured structured logic circuitry, provides a functionality that can be performed using a digital signal processing (DSP) block of a field-programmable gate array (FPGA).

EXAMPLE EMBODIMENT 12. A method comprising:

receiving a via-customized system design that includes via-configurable structured logic circuitry and a plurality of embedded arithmetic blocks that interface with the via-configured structured logic circuitry to perform arithmetic functions, wherein the embedded arithmetic blocks comprise a plurality of monolithic arithmetic circuits; and manufacturing a via-configured integrated circuit based on the via-customized system design, wherein manufacturing the via-configured integrated circuit comprises selectively filling vias to via-configure the structured logic circuitry.

EXAMPLE EMBODIMENT 13. The method of example embodiment 12, wherein the via-customized system design identifies vias that have been selected to configure the via-configurable structured logic circuitry by selectively filling vias in a plurality of via-configurable lookup tables and a plurality of via-configurable routing wires.

EXAMPLE EMBODIMENT 14. The method of example embodiment 12, wherein the plurality of embedded arithmetic blocks of the via-customized system design comprise a plurality of monolithic multiplier circuits and a plurality of monolithic adder circuits.

EXAMPLE EMBODIMENT 15. The method of example embodiment 12, comprising providing a plurality of via-customizable system designs that respectively include a different plurality of embedded arithmetic blocks, wherein the via-customized system design is based on one of the plurality of via-customizable system designs.

EXAMPLE EMBODIMENT 16. An integrated circuit comprising:

via-configured structured logic circuitry having a plurality of via-configured lookup tables and a plurality of via-configured routing wires; and a plurality of arithmetic blocks embedded adjacent to the via-configured structured logic circuitry, wherein the embedded arithmetic blocks comprise a plurality of monolithic arithmetic circuits.

EXAMPLE EMBODIMENT 17. The integrated circuit of example embodiment 16, wherein at least one of the plurality of arithmetic blocks comprises an array of monolithic multipliers.

EXAMPLE EMBODIMENT 18. The integrated circuit of example embodiment 17, wherein the at least one of the plurality of arithmetic blocks comprises a monolithic shift/sum block.

EXAMPLE EMBODIMENT 19. The integrated circuit of example embodiment 18, wherein the at least one of the plurality of arithmetic blocks comprises a monolithic adder tree.

EXAMPLE EMBODIMENT 20. The integrated circuit of example embodiment 16, wherein the at least one of the plurality of arithmetic blocks comprises a monolithic multiplier that multiplies FP64 or wider data.

EXAMPLE EMBODIMENT 21. The integrated circuit of example embodiment 16, wherein the at least one of the plurality of arithmetic blocks comprises a monolithic adder that adds FP64 or wider data.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An integrated circuit comprising:

via-configured structured logic circuitry; and an embedded arithmetic block that interfaces with the via-configured structured logic circuitry to perform an arithmetic function, wherein the embedded arithmetic block comprises a plurality of monolithic arithmetic circuits, and wherein the via-configured structured logic circuitry comprises a via-configured feedback path that couples an output of the embedded arithmetic block with an input of the embedded arithmetic block.

2. The integrated circuit of claim 1, wherein the via-configured structured logic circuitry comprises a plurality of via-configured lookup tables.

3. The integrated circuit of claim 1, wherein the embedded arithmetic block comprises a multiplier.

4. The integrated circuit of claim 3, wherein the via-configured structured logic circuitry comprises structured logic circuitry that has been via-configured to form a pre-adder to perform an addition function prior to the embedded arithmetic block.

5. The integrated circuit of claim 3, wherein the embedded arithmetic block comprises a post-adder to perform an addition function using outputs of the multiplier.

6. The integrated circuit of claim 1, wherein the embedded arithmetic block, in concert with the via-configured structured logic circuitry, provides a functionality that is configured to be performed using a digital signal processing (DSP) block of a field-programmable gate array (FPGA).

7. The integrated circuit of claim 1, wherein the integrated circuit is produced according to a method comprising:

receiving a via-customized system design that includes via-configurable structured logic circuitry and a plurality of embedded arithmetic blocks, comprising the embedded arithmetic block, that interface with the via-configured structured logic circuitry to perform a plurality of arithmetic functions, comprising the arithmetic function, wherein the plurality of embedded arithmetic blocks comprise the plurality of monolithic arithmetic circuits; and manufacturing the integrated circuit as a via-configured integrated circuit based on the via-customized system design, wherein manufacturing the via-configured integrated circuit comprises selectively filling vias to via-configure the via-configurable structured logic circuitry.

8. The integrated circuit of claim 7, wherein the via-customized system design identifies vias that have been selected to configure the via-configurable structured logic circuitry by selectively filling vias in a plurality of via-configurable lookup tables and a plurality of via-configurable routing wires.

9. The integrated circuit of claim 7, wherein the plurality of embedded arithmetic blocks of the via-customized system design respectively comprise a plurality of monolithic multiplier circuits and a plurality of monolithic adder circuits.

10. The integrated circuit of claim 7, wherein the integrated circuit is produced according to the method, wherein the method comprises providing a plurality of via-customizable system designs that respectively include a different plurality of embedded arithmetic blocks, wherein the via-customized system design is based on one of the plurality of via-customizable system designs.

11. The integrated circuit of claim 1, wherein the via-configured structured logic circuitry comprises a plurality of via-configured lookup tables and a plurality of via-configured routing wires, and wherein the embedded arithmetic block is one of a plurality of arithmetic blocks embedded adjacent to the via-configured structured logic circuitry, wherein the plurality of arithmetic blocks comprise a plurality of monolithic arithmetic circuits.

12. The integrated circuit of claim 11, wherein at least one of the plurality of arithmetic blocks comprises an array of monolithic multipliers.

13. The integrated circuit of claim 12, wherein the at least one of the plurality of arithmetic blocks further comprises a monolithic shift/sum block.

14. The integrated circuit of claim 13, wherein the at least one of the plurality of arithmetic blocks further comprises a monolithic adder tree.

15. The integrated circuit of claim 11, wherein at least one of the plurality of arithmetic blocks comprises a monolithic multiplier that multiplies FP64 or wider data.

16. The integrated circuit of claim 11, wherein at least one of the plurality of arithmetic blocks comprises a monolithic adder that adds FP64 or wider data.

17. The integrated circuit of claim 1, wherein the embedded arithmetic block further comprises at least 300 input wires and at least 300 output wires in communication with the via-configured structured logic circuitry.

18. An integrated circuit comprising:

via-configured structured logic circuitry; and an embedded arithmetic block that interfaces with the via-configured structured logic circuitry to perform an arithmetic function, wherein the embedded arithmetic block comprises a plurality of monolithic arithmetic circuits, wherein the embedded arithmetic block comprises a multiplier, and wherein the embedded arithmetic block comprises a pre-adder to perform an addition function on data prior to multiplication by the multiplier.

19. An integrated circuit comprising:

via-configured structured logic circuitry; and an embedded arithmetic block that interfaces with the via-configured structured logic circuitry to perform an arithmetic function, wherein the embedded arithmetic block comprises an plurality of monolithic arithmetic circuits, wherein the embedded arithmetic block comprises a multiplier, and wherein the via-configured structured logic circuitry comprises structured logic circuitry that has been via-configured to form a post-adder to perform an addition function using outputs of the multiplier.

20. An integrated circuit comprising:

via-configured structured logic circuitry; and an embedded arithmetic block that interfaces with the via-configured structured logic circuitry to perform an arithmetic function, wherein the embedded arithmetic block comprises a plurality of monolithic arithmetic circuits, and wherein the embedded arithmetic block further comprises via-configured control circuitry that controls an operation of the plurality of monolithic arithmetic circuits.

* * * * *